Jan. 12, 1943.  L. F. BAKER  2,308,238
FISHLINE SINKER
Filed April 15, 1941
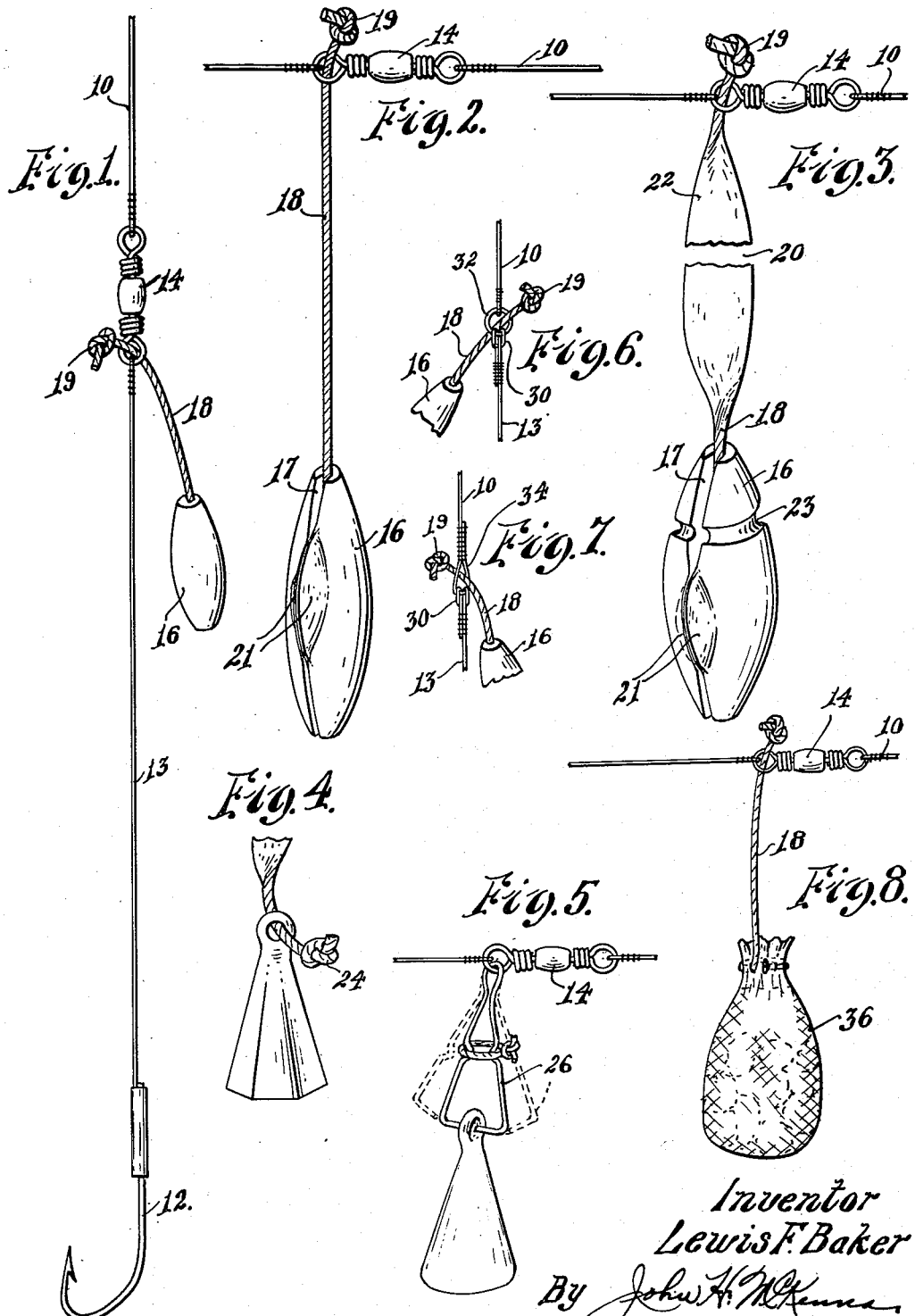
Inventor
Lewis F. Baker
By John H. McKenna,
Attorney Patented Jan. 12, 1943

2,308,238

UNITED STATES PATENT OFFICE 2,308,238

FISHLINE SINKER

Lewis F. Baker, Braintree, Mass.

Application April 15, 1941, Serial No. 388,601

7 Claims. (Cl. 43—52)

This invention relates to improvements in fish-line sinkers.

It relates to fish-line sinkers generally, which may range in weight from a fraction of an ounce to four ounces or more, depending upon the kind of fishing to be engaged in, and the particular desires of individual fishermen. The invention provides improvements in the means for attaching a sinker to a fish line whereby it may perform its ordinary and usual functions until the bait reaches a destination in the region of the bottom of a pond, lake or ocean, and then may cease to be a restraining influence upon the bait, which latter becomes free to float or drift where it will.

Heretofore, fish-line sinkers, after serving to get the bait to a desired destination, have continued on the line, acting as an anchor to hold the bait against any life-like drifting of it through the body of water, and frequently holding the bait hidden in mud and vegetable matter on the bottom. Also, when a sinker remains on a line, it may interfere with the freedom of action of a hooked fish, striking or rubbing the fish in the region of its head, and taking some of the fight out of the catch, with consequent diminution of the sport involved to land it. Then too there is danger of the sinker becoming caught between stones, etc. with or without a fish on the hook, thus introducing danger of breaking the tackle, or of losing any fish that may have been on the hook.

It is among the objects of the invention to provide so that a sinker can perform as is usual until the bait has been brought to a proper destination, and then will cease to be a weight or anchor on the line.

Another object is to provide for the quick and convenient attachment of my improved sinker to a line, thereby to facilitate the putting on of a new sinker preliminary to a throwing or casting of the bait.

Still another object is to provide so that each departing sinker may leave the line clean of any residue of its attaching means.

It is, moreover, an important feature that the bodies of my improved sinkers may be of any desired sizes and shapes, including those heretofore available, and that my improved attaching means may be quickly, effectively and economically incorporated therein, or associated therewith.

The mentioned objects and results may be attained by employing any suitable sinker body, which may be the usual chunk of lead or other heavy material, of desired size and shape. The sinker body is provided with a non-permanent means for attaching it to a fish line, such as a means which has adequate tensile strength when dry, but which loses a great part of that strength when exposed for a short time to the effects of water. Initially it must withstand the stresses incident to a throwing or casting of bait but, according to the invention, it quickly loses its tenacity and strength in water, with the result that gravity or other means will cause the sinker to drop off the line after the connection has been exposed to the effects of water for a short period of time. The attaching means, for example, may be of decomposable material and may be in the form of a short length of string secured at opposite ends to the sinker and to the line, or may be combined with a mechanical fastener, held closed by the decomposable material when dry, and automatically openable when the material loses its strength in water. Twisted, unsized paper may be used as the decomposable material, Preferably the connection will be such that no remnant or residue of the attaching means will remain to disfigure the line after a sinker drops off.

It is intended that the patent shall cover, by suitable expression in the appended claims, whatever features of patentable novelty exist in the invention disclosed.

In the accompanying drawing:

Figure 1 is an elevation of the hook end portion of a fish-line having a sinker thereon embodying features of the invention;

Figure 2 is an elevation of the sinker and its attaching means, on a larger scale;

Figure 3 is a view similar to Figure 2, but showing the attaching twine untwisted and rent apart for releasing the sinker;

Figure 4 is an elevation illustrating the invention applied to another type of sinker;

Figure 5 is an elevation of a modified form of attaching means.

Figure 6 is an elevation showing still another way of attaching my sinker, utilizing the loop at the attaching end of a gut leader, and a metal ring at the end of the line;

Figure 7 is a similar view showing a loop in the end of the line engaging a similar loop at the end of a gut leader; and Figure 8 shows a sinker in the form of a bag, which may contain any suitable weighty material.

Referring to the drawing, an ordinary fish-line is represented at 10, with a hook 12 at the end of a leader 13, in Figure 1, and with a usual swivel element 14 at a suitable distance from the hook for permitting the end portion of the line and the hook to rotate, thereby to avoid fouling of the longer portion of line which extends out from the fishing rod or other tackle.

According to the invention a sinker is temporarily attached to the line at a suitable place thereon, for facilitating the getting of the baited hook to a desired destination below the surface of a body of water and, having served this purpose, the sinker is adapted to drop off the line after which the hook and bait are left free to drift or float where they will. Ordinarily the bait will sink slowly to the bottom, but a jerk on the line will cause it to rise again, whereas, with the sinker attached as is usual, such a pull on the line merely drags the sinker along the bottom with no appreciable elevating of the bait.

The sinker body may be of any suitable material, such as lead or other relatively heavy material, of size and shape to suit any particular requirements. Ordinarily sinkers range in weight between one-half ounce and four ounces, depending upon the kind and type of fishing to be engaged in.

In Figure 1 such a sinker 16 of ovoid shape has secured to it an attaching means by which the sinker body may be secured to the line 10, or to the swivel element 14. As represented in Figure 1 the attachment is a short length 18 of twisted unsized paper, with the sinker 16 at one end and with its other end passed through one eye of the swivel 14 and knotted as at 19 to prevent its slipping out of the eye.

Any suitable length of the twisted paper twine may be employed but usually the sinker will be suspended to hang down from two to six inches from its point of attachment to the line. It is unimportant that the sinker may be caught between stones, etc., because it will have served its purpose before such an occurrence, and promptly will free itself from the line.

Twisted paper twine as above specified, has considerable tensile strength when dry, but quickly disintegrates in water. Thus the sinker is securely retained on the line for a casting or throwing out of a baited hook or a fly, but the paper quickly loses its strength once it becomes immersed in water, thereby permitting the sinker to drop off the line or to be shaken off, a few seconds after the bait has been carried to a desired destination.

A wanted rapid disintegration of the paper twine is promoted by attaching the sinker at the free end of the length of twine, because the twine can then untwist under the initial action of the water, thus exposing interior portions, as in Figure 3, to the disintegrating effects of the water.

Another feature of the structure illustrated in Figures 1-3 is the particular attachment of the twine 18 to the line 10, by passing it through a metal eye on the usual swivel 14, with the knot 19 in the twine maintaining the attachment. When the twine ultimately breaks at a mid-location between the line and sinker, as at 20 in Figure 3, the remnant 22 of twine left in the eye, can disengage itself, or can be easily removed, to leave the line clean of such remnants. However, it will be obvious that the paper twine may be tied directly to the line, if desired.

With sinkers of the general style shown in Figures 1-3, I find it convenient to provide a groove 17, within which an end portion of the twine 18 may be clamped by deforming the walls of groove as at 21, to pinch the twine. However, the sinker may be attached to the twine in any convenient manner, even by tieing the twine about the body of the sinker, which may be circumferentially grooved, as at 23 in Figure 3, for this purpose.

In case of sinkers having an eye, as in Figures 4 and 5, this end of the twine also may be passed through the eye and knotted, as at 24 in Figure 4.

Figure 5 illustrates a resilient wire attaching means 26 which may be held, by a water decomposable element 28, secure on the line until the decomposable element loses its strength under the action of water, and permits the wire element to release itself from the sinker by its own resilience. Or the resilient means may grip the line and fall away with the sinker when released.

Figures 6 and 7 illustrate the attachment of my sinkers by means of the loop ordinarily provided at the attaching end of a gut leader 13. Figure 6 has a loop 30 of the gut attached to a metal ring 32 at the end of the line 10; while Figure 7 has a loop 34 at the end of the line, in which the loop 30 of a gut leader is secured.

In Figure 8 there is portrayed a sinker in the form of a bag 36 within which any suitable weighty material may be put. In this case the attaching string 18 of unsized paper, or the like, constitutes a draw string for the bag. The bags may be of inexpensive material, and the weight may be provided by sand or stones, put into the bag.

Although twisted unsized Kraft paper twine is herein disclosed as a preferred attaching means for my sinkers, it should be understood that other materials or substances may be employed with like effect, the essential requirement being that the attaching means shall respond quickly to the effects of water, to release the sinker after it has served its purpose of carrying the bait to a desired destination.

I claim as my invention:

1. A fishing device comprising a sinker, means for connecting the sinker to a fish-line, said means when dry having tensile strength adequate for withstanding stresses imposed upon it by a casting or throwing of a baited end of the fish-line to a desired destination, and being adapted to lose the major portion of that tensile strength when wet, whereby the sinker, having aided in bringing the bait to said desired destination, drops away, as a result of rupture of said element, leaving the bait and line free to drift where they will.

2. A fishing device as in claim 1, wherein said means is a ligament of material whose structural components adhere together strongly when dry but which quickly loses the major portion of its tensile strength in the presence of water.

3. A fishing device as in claim 1, wherein said means is a length of twisted unsized paper.

4. A fishing device as in claim 1, wherein said means is a length of twisted unsized paper, secured at one end to the sinker and adapted for its other end to be secured to a fish-line.

5. A fishing device as in claim 1, wherein said means is a ligament of twisted paper twine whose fibres are held together by a substance which dissolves quickly in water.

6. A fishing device as in claim 1, wherein the sinker is a bag holding weighty material, and said means is a ligament of water-decomposable material constituting a draw string for the bag.

7. A fishing device as in claim 1, wherein said means when wet resiliently spreads for rupture to release the sinker.

LEWIS F. BAKER.